Figure 1:
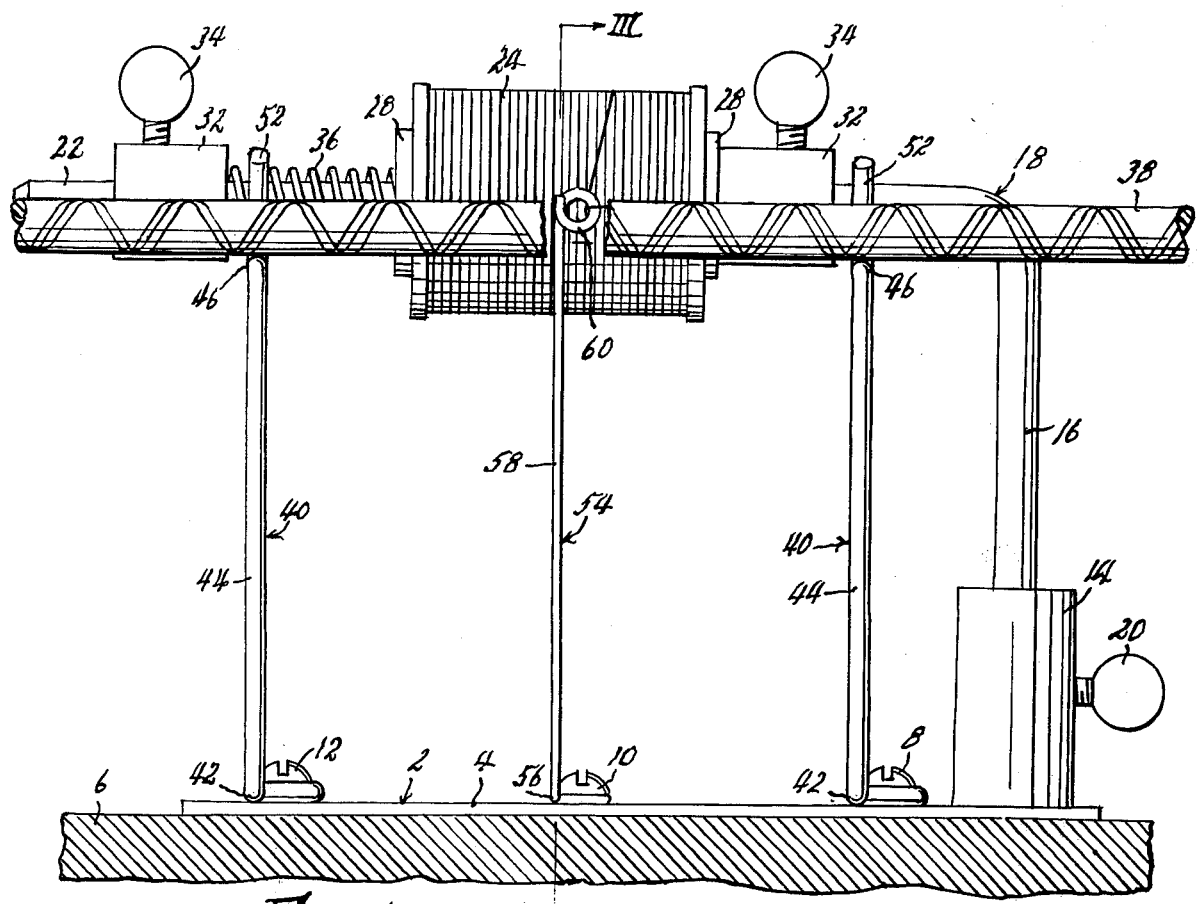

United States Patent [19]

Cope

[11] 4,442,981
[45] Apr. 17, 1984

[54] FISHING ROD WRAPPING DEVICE

[76] Inventor: James R. Cope, 10500 Cherokee La., Leawood, Kans. 66206

[21] Appl. No.: 383,018

[22] Filed: May 28, 1982

[51] Int. Cl.³ .............................................. B65H 81/06
[52] U.S. Cl. .......................................... 242/7.19; 43/1
[58] Field of Search .................. 242/7.19; 57/11; 43/1; 29/240; 156/425, 429, 446

[56] References Cited

U.S. PATENT DOCUMENTS

| | | | |
|---|---|---|---|
| 2,556,827 | 6/1951 | Striano | 242/7.19 |
| 2,609,155 | 9/1952 | Fosnaugh | 242/7.19 |
| 2,640,653 | 6/1953 | Wodetzky | 242/7.19 |
| 4,315,606 | 2/1982 | Seiders | 242/7.19 |

Primary Examiner—Billy S. Taylor
Attorney, Agent, or Firm—John A. Hamilton

[57] ABSTRACT

A fishing rod wrapping device consisting of a fixed frame adapted to support one or more spools of wrapping thread for axial rotation, a friction device resisting rotation of said spool whereby thread may be paid out therefrom under a controlled and adjustable tension, a support for a fishing rod adapted to support the rod in parallel relation to the spool, so that the thread, when attached to the rod, is wrapped on the rod when the rod is manually rotated about its axis, the rod support being configurated to maintain the rod parallel to the spool, to retain the rod thereon despite any degree of thread tension, and to permit locking of the rod against movement relative to the spool whenever interruption of the wrapping process may be desired, whereby to preserve both the rod position and the thread tension until the process is recommenced.

2 Claims, 4 Drawing Figures

FISHING ROD WRAPPING DEVICE

This invention relates to new and useful improvements in devices for aiding or assisting in the wrapping of fishing rods with threads.

It is common practice to wrap fishing rods, particularly those portions of the rods at and adjacent the handles, with threads, usually nylon, for different reasons. One purpose of such wrapping is to reinforce a rod against possible splitting. Another purpose is rod decoration, it being possible, especially by using multiple threads of different colors, and by the use of intricate wrapping patterns, to produce quite beautiful rods with delicate and involved thread patterns. Wrapping is also commonly used to secure fishing line loops or keepers to a rod, such keeper loops usually being provided with semi-cylindrical extensions which embrace the rod, and are secured thereto by thread wrapped securely about both.

It would of course be possible for a person with a sufficiently high degree of skill and dexterity to perform the wrapping operation entirely manually, with no tools or apparatus other than a spool of wrapping thread. However, such a manual operation is subject to many difficulties, for example the maintenance of an even tension on the thread as it is wrapped around the rod, and the maintenance of a uniform angle of approach of the thread to the rod during wrapping, both of which are essential to a neat and attractive appearance of the finished job. If a particular pattern requires the simultaneous application of a plurality of threads (usually of different colors), the difficulties would render manual performance virtually impossible, since the threads would necessarily emanate from different sources, and the tension and angle of approach of each to the rod would have to be separately controlled, while at the same time manually turning the rod to wrap the threads thereon.

Accordingly, the primary object of the present invention is the provision of a device which greatly simplifies the rod wrapping operation, and brings it well within the capabilities of a person having only average skill and dexterity. Generally, this object is accomplished by the provision of a device including a frame having means for mounting one or more spools of wrapping thread for coaxial rotation, and from which the thread is extended, and a rod support for supporting a fishing rod in parallel relation to the spool axis. The extended thread or threads are secured to the rod, and wrapped thereon by manual rotation of the rod. The rod is moved manually in a direction parallel to its axis to control the angle of approach of the threads to the rod, whereby to produce helical wrappings or the like.

Another object is the provision of a device of the character described including means for applying a controlled and adjustable frictional resistance to the rotation of said spool or spools, whereby the thread or threads are delivered to the rod under a controlled, uniform tension.

A further object is the provision of a device of the character described including a thread guide comprising a small eye interposed between the spools and the rod, and through which all of the threads pass. This provides that all of the threads will approach the rod at substantially the same angle, and reduces the required longitudinal movement of the rod regardless of the number of threads being used.

A still further object is the provision of a device of the character described including locking means operable to immobilize the rod against either rotation or longitudinal movement whenever desired. The wrapping process is often tedious and time-consuming, and hence inconvenient to complete at a single sitting. The locking means permits interruption of the process at any time, for any time period, with no danger of relaxing the line tension or disturbing the angle of approach of the thread to the rod.

Other objects are simplicity and economy of construction, and efficiency and dependability of operation.

Figure 2:
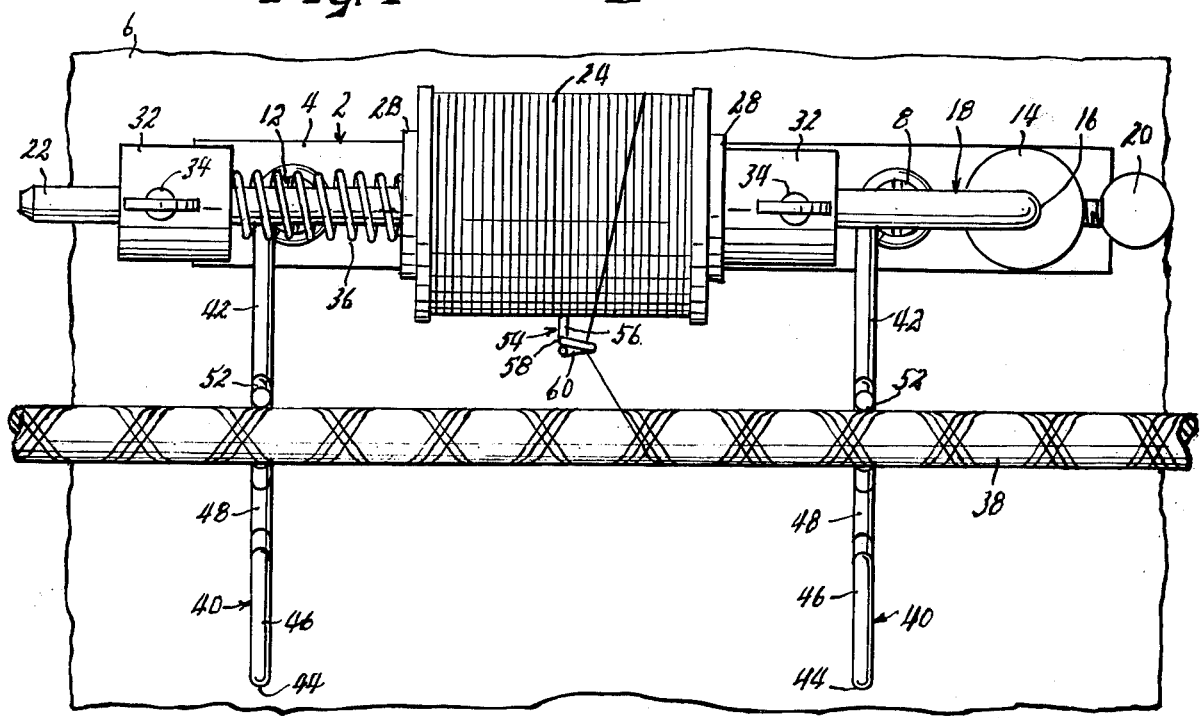
Figure 3:
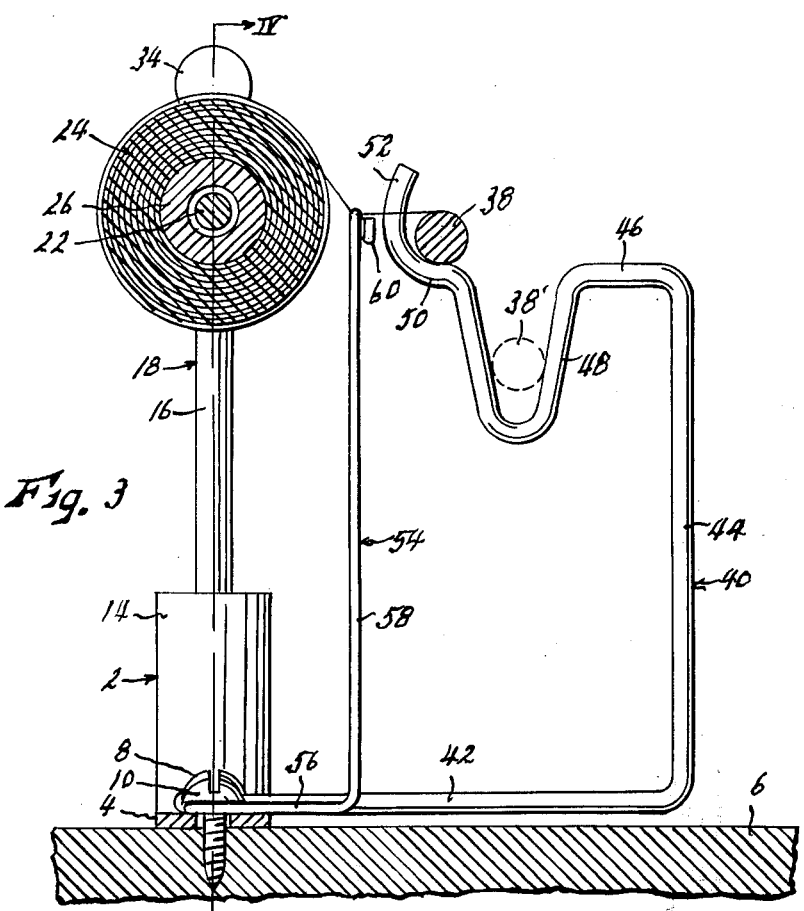
Figure 4:
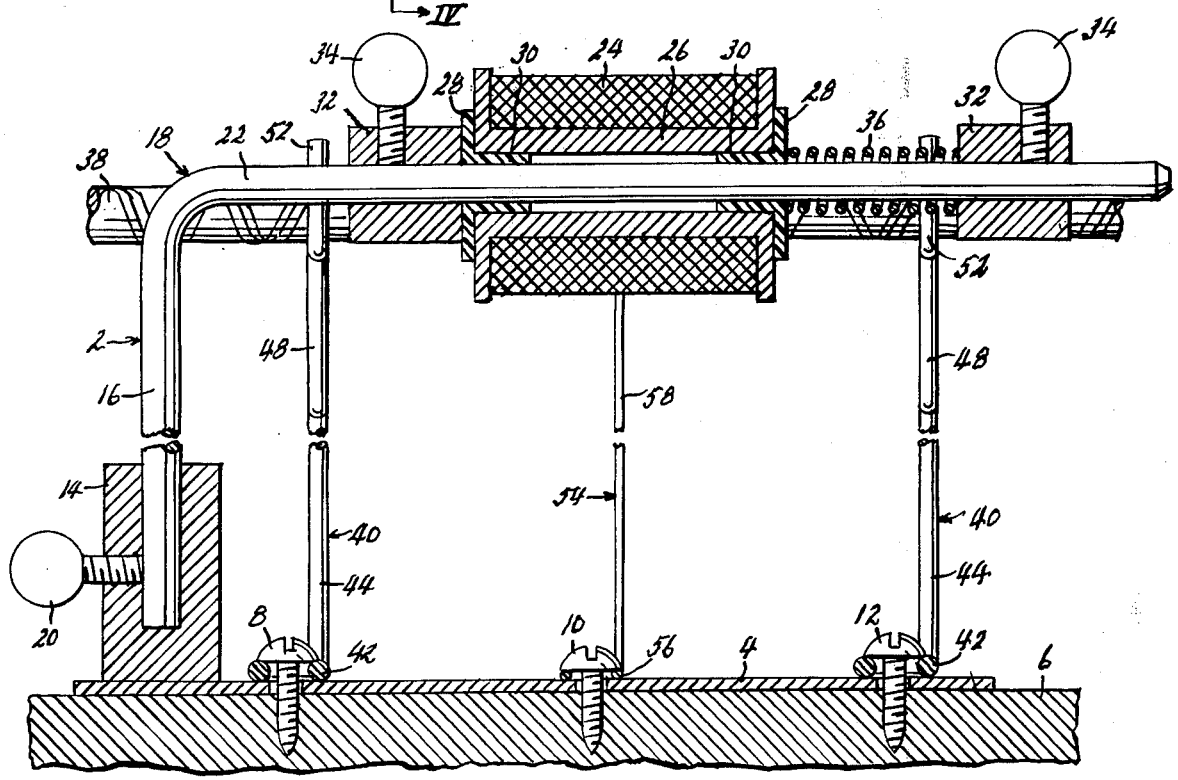

With these objects in view, as well as other objects which will appear in the course of the specification, reference will be had to the accompanying drawing, wherein:

FIG. 1 is a front elevational view of a fishing rod wrapping device embodying the present invention, showing a fishing rod in operative relationship thereto, and partially broken away, FIG. 2 is a top plan view of the device as shown in FIG. 1, FIG. 3 is a sectional view taken on line III—III of FIG. 1, and FIG. 4 is a foreshortened sectional view taken on line IV—IV of FIG. 3.

Like reference numerals apply to similar parts throughout the several views, and the numeral 2 applies generally to the frame of the device. Said frame includes a flat metal strap 4 secured to a base 6 by three screws 8, 10 and 12 spaced therealong. If the device is to be portable, base 6 may constitute simply a flat wooden board, but if it is to be a permanent installation, base 6 may constitute the top of a table or workbench. Rising from one end of strap 4 is a socket member 14 in which the vertical leg 16 of a right-angled bar 18 is secured by set screw 20. The horizontal leg 22 of bar 18 is disposed above and parallel to strap 4, and serves as a shaft on which one or more spools 24 of wrapping thread may be rotatably mounted for axial rotation.

Only one spool 24 is shown in the drawing, but it will be understood that at least three axially shorter spools could be mounted on shaft 22 if desired. Shaft 22 passes through the central orifice of the spool hub 26, and a friction washer 28 formed of a plastic such as nylon abuts each end of the spool, each washer being provided with a cylindrical hub 30 (see FIG. 4) projecting into the central orifice of the spool. If the central orifice is too small to admit hubs 30, the washers may be reversed so that their hubs extend outwardly. A pair of collars 32 are mounted slidably on shaft 22 respectively at the opposite sides of spool 24 and each is fixable on the shaft by means of a set screw 34. One of said collars bears directly against the washer 28 at the adjacent end of the spool, but a helical compression spring 36 encircling shaft 22 is interposed between the other of the collars and the washer 28 at the opposite end of the spool. If more than one spool is used, the collars are disposed at the opposite ends of the entire set of spools, and a friction washer 28 is interposed between each adjacent pair of spools. The tension of spring 36 may be adjusted by loosening the set screw 34 of either collar, and moving said collars relatively closer together or farther apart. The spring and washers apply a frictional load to rotation of the spool or spools on shaft 22, so that thread pulled therefrom will always be under tension, determined by the degree of compression of spring 36. If a plurality of spools are used, the threads from all of them will be under the same tension, since they are all frictionally loaded by the same spring. This tension may be set to the tension preferred by each individual user, simply by marking the positions of collars 32 on shaft 22.

There is also provided a support for holding a fishing rod 38 (shown fragmentarily) at a position substantially parallel to shaft 22, but spaced apart forwardly therefrom and generally at the same level, and supporting said rod loosely, so that it is both manually rotatable about its axis, and movable longitudinally in a direction parallel to its axis. As shown, this support consists of a pair of identically formed metal rods each indicated generally by the numeral 40, and each configurated as best shown in FIG. 3. The rods are secured, each at one end, respectively under the heads of screws 8 and 12, these being the sidemost screws affixing strap 4 to base 6, and each is then formed to present, successively, a horizontal leg 42 extending well forwardly of shaft 22, transversely thereto, a vertical leg 44 extending upwardly generally to the level of shaft 22, a short horizontal leg 46 parallel to leg 42 and extending toward shaft 22, a downward extending upwardly opening V-formation 48, a short horizontal leg 50 (see FIG. 3) extending toward shaft 22 generally at the level thereof, and finally an upwardly and forwardly curved terminal portion 52 which is spaced forwardly of shaft 22, and of any thread spool 24 carried thereby, and which is convexly curved at the side thereof toward said shaft and spool.

Finally, there is provided a thread guide indicated generally by the numeral 54 and consisting of a length of wire secured at one end under the head of screw 10, this being the central screw affixing strap 4 to base 6, then successively presenting a horizontal, forwardly projecting leg 56, and a vertical, upwardly projecting leg 58 terminating at its upper end in a helically formed small eye 60. Said eye is disposed intermediate a spool 24 carried by shaft 22 and a fishing rod 38 supported by legs 50 of rod support bars 40, and generally at the same level, opening generally radially of shaft 22.

In operation, spools 24 of the desired number are mounted on shaft 22, with the number generally being dictated by the number of thread colors desired in the planned wrapping pattern, with each spool carrying a thread of one color. The desired thread tension is provided for by adjusting collars 32 along the shaft to vary the tension of spring 36. The thread or threads are then pulled from the spools, lead through eye 60, into which they may be introduced laterally of themselves due to the helical formation of said eye, and their ends secured to fishing rod 38 by tying or any other suitable manner, not shown as forming no part of the present invention. The wrapping operation is then accomplished by manually rotating fishing rod 38 in a direction to wind the thread or threads thereon (clockwise as viewed in FIG. 3), while at the same time manually moving the fishing rod longitudinally, or in a direction parallel to its axis, to control the angle of approach of the threads to the rod. The thread tension is maintained constant at all times by spring 36 and friction washers 28, this uniformity of tension being extremely important to neat, attractive wrapping. Control of the angle of approach of the threads to the rod, provided by manually shifting the rod longitudinally of itself against the tension of the threads, as best illustrated in FIG. 2, is likewise extremely important in forming a neat attractive appearance to the finished wrapping, especially when the wrapping pattern is essentially spiral or helical in nature as shown. Most wrapping patterns are basically helical in form, though subject to numerous variations and refinements, and any noticeable variation in the helical pitch is highly detrimental to attractive appearance. When the wrapping is completed, the thread ends are cut and secured against unwinding by any suitable means, not shown and not considered to be pertinent to the present invention, and finally the wrapping sealed by an overall coating of epoxy or the like.

The formation of fishing rod support bars 40 is of substantial importance. The rod support "shoulders" or "ledges" provided by short horizontal sections 50 of said bars carry said rod for free axial rotation and free longitudinal movement during wrapping, while at the same time guiding said rod in the desired attitude relative to the thread spool or spools, and leaving the length of the fishing rod between bars 40 free and unobstructed for the application of thread thereto. The thread tension maintains the fishing rod on "shoulders" 50, and prevents said rod from falling into the V-formations 48 of said bars. The function of said V-formations will be described hereinbelow. Nevertheless, no degree of thread tension, however high, can pull the fishing rod free of support bars 40, since such tension simply pulls the rod into the concave stops provided by the upwardly and forwardly curved terminal portions 52 of said bars.

Thread guide eye 60 is also extremely important to the efficient operation of the device. It provides substantially a "point source" for the thread relative to the fishing rod, closely adjacent said rod, so that helical wrapping of virtually any desired pitch can be formed with only a relatively very slight longitudinal motion of the rod. Without said eye, the longitudinal movement of the rod required to maintain a given pitch in a helical wrapping would not only vary quite widely, depending on the end of the spool 24 from which the thread was proceeding at any given moment, and this point of departure of the thread from the spool would change continuously to render visual maintenance of a given pitch angle extremely difficult, but also the required longitudinal movement could be very large, quite possibly exceeding any span which could reasonably be provided between the support rods 40, especially if spool 24 is long, or if more than one spool is carried by shaft 22. Thus the "point source" provided by eye 60 both renders the visual and manual maintenance of a given pitch angle much easier, and greatly shortens the required longitudinal movement of the fishing rod. If indeed two or more spools 24 are supplying wrapping threads simultaneously, then eye 60 is essential, since in no other way can it be guaranteed that all of the threads will approach the fishing rod at the same pitch angle. Obviously, if threads were approaching the rod from all of a plurality of spools spaced along shaft 22, they would do so at different angles of approach in the absence of the guide eye.

In view of the facts that the wrapping patterns desired by many fishermen are often extremely intricate and complicated, and that the wrapping process is therefore often very tedious and time-consuming, to the point that it cannot conveniently be completed at a single sitting, it obviously would be desirable to be able to interrupt the process whenever desired without disturbing the portion of the wrapping completed at that time. In the present device, this function is provided by the V-formations 48 of support bars 40. Whenever it may be desired to interrupt the wrapping process, fishing rod 38 is simply lowered into these formations, as indicated in dotted lines at 38 in FIG. 3, and wedged snugly therein. This locks the fishing rod against rotation, thus preserving the tension of any thread or threads being wrapped thereon and thereby preventing the loosening and disarrangement of any previously applied turns of the wrapping, and also locks the fishing rod against longitudinal movement, thereby securing the approaching threads at the desired pitch angle relative to the rod. The side reaches of rods 40 forming the V-formations must of course be disposed at a sufficiently acute relative angle for the wedging action to occur. The wrapping process may be recommenced whenever desired simply by lifting the fishing rod from formations 48.

While I have shown and described a specific embodiment of my invention, it will be readily apparent that many minor changes of structure and operation could be made without departing from the spirit of the invention.

What I claim as new and desire to protect by Letters Patent is:

1. A fishing rod wrapping device comprising:
   a. a frame,
   b. spool support means carried by said frame and operable to support a spool of wrapping thread for rotation on its axis, and
   c. fishing rod support means carried by said frame and operable to support a fishing rod in parallel relation to but laterally spaced apart from the axis of said spool, for free manual rotation about its axis and longitudinal movement parallel to its axis, said fishing rod support means comprising a pair of support members carried by said frame and spaced apart axially of a thread spool carried by said spool support means, said support members each having a generally horizontal rest portion on which said fishing rod may rest freely for manual rotation and longitudinal movement, each of said rod supporting members being provided additionally with locking means operable by manual movement of said rod relative to said support members to lock said rod against free rotation and longitudinal movement, whereby to preserve the existing thread tension and rod position in the event it may be desired to interrupt the wrapping process.

2. A fishing rod wrapping device as recited in claim 1 wherein said locking means comprises an upwardly opening V-shaped formation of each of said rod support members immediately adjacent the rest position of said rod thereon, into which said rod may be manually lowered and wedged to secure it releasably against any movement relative to said rod support members.

* * * * *